US006809765B1

(12) United States Patent
Tao

(10) Patent No.: US 6,809,765 B1
(45) Date of Patent: Oct. 26, 2004

(54) DEMOSAICING FOR DIGITAL IMAGING DEVICE USING PERCEPTUALLY UNIFORM COLOR SPACE

(75) Inventor: Bo Tao, Sunnyvale, CA (US)

(73) Assignees: Sony Corporation, Tokyo (JP); Sony Electronics Inc, Park Ridge, NJ (US)

(*) Notice: Subject to any disclaimer, the term of this patent is extended or adjusted under 35 U.S.C. 154(b) by 0 days.

(21) Appl. No.: 09/412,187

(22) Filed: Oct. 5, 1999

(51) Int. Cl.[7] .................. H04N 5/335; H04N 1/46; G06K 9/36; G06K 9/32; G03F 3/08

(52) U.S. Cl. .................. 348/273; 382/276; 382/300; 358/515; 358/518; 358/525

(58) Field of Search .................. 348/273, 277, 348/278, 280, 222.1; 382/275, 276, 277, 300; 358/515, 518, 525

(56) References Cited

U.S. PATENT DOCUMENTS

| 4,743,960 | A | * | 5/1988 | Duvic et al. .................. 348/660 |
| 5,053,861 | A | * | 10/1991 | Tsai et al. .................. 375/240.01 |
| 5,172,227 | A | * | 12/1992 | Tsai et al. .................. 375/240.2 |
| 5,185,661 | A | * | 2/1993 | Ng .................. 358/505 |
| 5,528,292 | A | * | 6/1996 | Ikeda .................. 348/273 |
| 5,596,367 | A | * | 1/1997 | Hamilton et al. .................. 348/272 |
| 5,778,106 | A | * | 7/1998 | Juenger et al. .................. 382/275 |
| 6,249,797 | B1 | * | 6/2001 | Kovacevic et al. .................. 708/300 |
| 6,295,087 | B1 | * | 9/2001 | Nohda .................. 348/273 |
| 6,392,699 | B1 | * | 5/2002 | Acharya .................. 348/273 |
| 6,404,918 | B1 | * | 6/2002 | Hel-or et al. .................. 382/167 |

OTHER PUBLICATIONS

Ron Kimmel, Sep. 1999, IEEE, vol. 8, No. 9, pp. 1221–1228.*
Ping Wah Pong et al., 1997, IEEE, 1063–6390/97, pp. 280–285.*

* cited by examiner

Primary Examiner—Andrew Christensen
Assistant Examiner—Nhan Tran
(74) Attorney, Agent, or Firm—Valley Oak Law

(57) ABSTRACT

A digital camera is provided having a lens for focusing light from an image through a RGB mosaiced filter on to a solid state photosensor array containing a matrix of CCDs. The CCDs provide a single-channel mosaiced image output. A demosaicing process includes a first color transformation after separation for determining luminance and a luminance interpolation for interpolation of missing luminance components. The demosaicing process further includes a second color transformation for obtaining chrominance components. A chrominance interpolation for interpolation of missing chrominance components and an inverse color transformation transforms the components into the RGB space for combination into an image output.

24 Claims, 6 Drawing Sheets

DEMOSAICING FOR DIGITAL IMAGING DEVICE USING PERCEPTUALLY UNIFORM COLOR SPACE

CROSS-REFERENCE TO RELATED APPLICATION

The present application contains subject matter related to a concurrently filed U.S. Patent Application by Bo Tao entitled "DEMOSAICING USING WAVELET FILTERING FOR DIGITAL IMAGING DEVICE". The related application is identified by application Ser. No. 09/412,351, is assigned to the same assignees, and is hereby incorporated by reference.

TECHNICAL FIELD

The present invention relates generally to digital video and still cameras, and more specifically, to such digital cameras using a single-channel, solid-state imaging sensor array.

BACKGROUND OF THE INVENTION

Solid-state digital video and still cameras are becoming more and more popular. Most of the current digital cameras use a single channel, solid-state photosensor array. For example, most of the digital still cameras on the market now are so-called 1-CCD (single channel charge coupled device) cameras. The solid-state photosensors are CCDs are arranged in an array in a matrix fashion with each CCD defining an element in the matrix called a "pixel". By placing a mosaiced color filter over the photosensor array, a single channel image is created where each pixel has a single color component. For example for a red-green-blue (RGB) system, a pixel has a single red (R), green (G), or blue (B) color component of a full color image. This forms a single channel mosaiced color image. The single channel mosaiced color image has to be demosaiced subsequently so that a full RGB (three-channel) image is created where each pixel contains the three RGB color components.

Each single-channel digital camera has its own unique demosaicing method. A number of patents have been filed on demosaicing methods such as U.S. Pat. No. 5,552,827 granted to Maenaka et al. titled "Color Video Camera with a Solid State image Sensing Device" and U.S. Pat. No. 4,716,455 granted to Ozawa et al. titled "Chrominance Signal Interpolation Device for a Color Camera". However, these demosaicing methods did not take into account the filtering and sampling process performed by the optical lens and the CCD. Thus, they often generate images that are not sharp and/or have aliasing effects.

Many programs have been published and/or patented on demosaicing. However, currently, demosaicing is done in a perceptually nonuniform color space, such as RGB space. Thus, false color artifacts can appear and the picture sharpness is also limited. These have been long standing problems in the industry.

SUMMARY OF THE INVENTION

The present invention provides a demosaicing process which includes a first color transformation into a perceptually uniform color space for determining luminance and a luminance interpolation for interpolation of the missing luminance component values. The demosaicing process further includes a second color transformation for determining chrominance where the color components are known using the luminance values. A chrominance interpolation is performed to interpolate missing chrominance components and an inverse color transformation transforms the chrominance components into the RGB colors.

The present invention provides a digital camera having a lens for focusing light from an image through a RGB mosaiced filter on to a solid state photosensor array containing a matrix of CCDs. The CCDs provide a single channel mosaiced image output. A demosaicing process includes a first color transformation for determining luminance and a luminance interpolation for interpolation of the missing luminance component values. The demosaicing process further includes a second color transformation for transforming the other known color components using the luminance. A chrominance interpolation is performed to interpolate missing chrominance components and an inverse color transformation transforms the components into the RGB colors. The present invention further provides super-resolution imaging for any application involving color image data interpolation.

The present invention further provides for generating high-resolution image/video from a low-resolution one. The present invention further provides a method to interpolate an NTSC or CCIR-601 signal into a HDTV signal. The above and additional advantages of the present invention will become apparent to those skilled in the art from a reading of the following detailed description when taken in conjunction with the accompanying drawings.

BRIEF DESCRIPTION OF THE DRAWINGS

FIG. 6 is a series of separated mosaiced image planes which are outputs of the separation process of the present invention;

FIG. 7 is a series of separated demosaiced image planes which are inputs to the combination process of the present invention;

DETAILED DESCRIPTION OF THE INVENTION

Figures 1, 2:
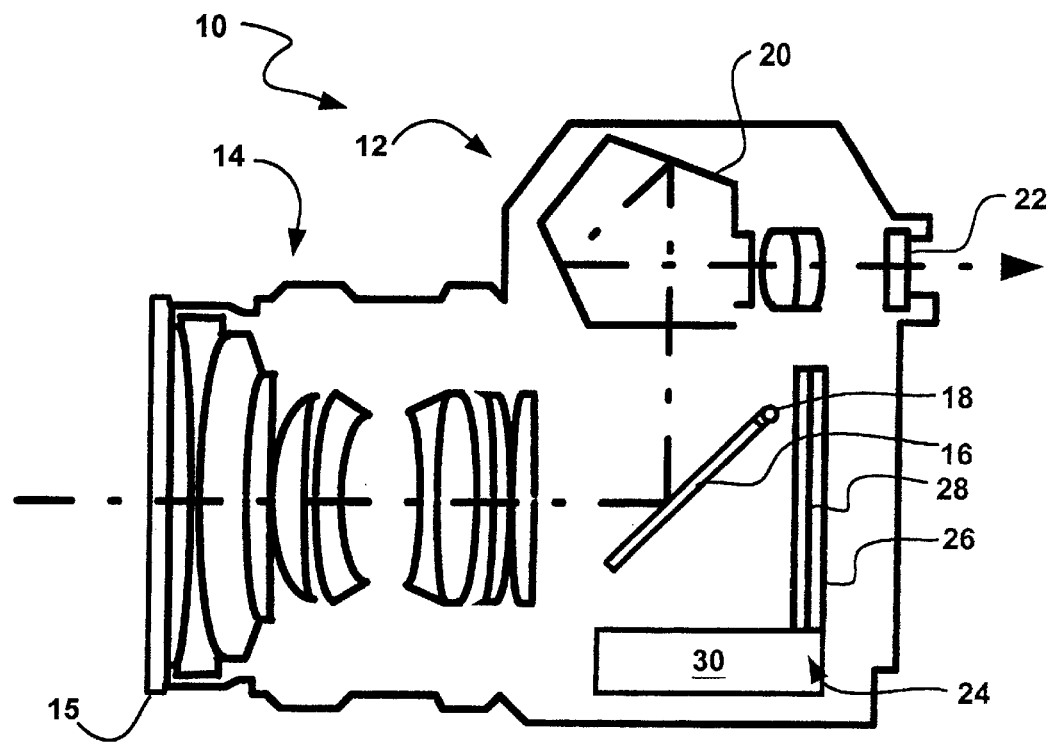
FIG. 1 is a solid state digital camera incorporating the present invention.
FIG. 2 is a mosaiced image in a Bayer pattern.

Referring now to FIG. 1, therein is shown a solid state digital camera 10 having a camera body 12 and an attached lens system 14 with a lens filter 15. A single lens reflex camera is shown as an example where the present invention is implemented, but it would be evident that the present invention would work for all still and motion cameras as well.

The camera 10 has a mirror 16 which pivots on a pivot 18 to initially direct light both from an image as well as ambient light through the lens filter 15 and the lens system 14 up to a prism 20 and out through an eyepiece 22.

When a picture is being taken, the mirror 16 is pivoted up so as to allow light to strike a recording medium 24. In a digital still camera (DSC), the digital recording medium 24 is a matrix of photosensors, such as analog output, single channel, charge-coupled devices (CCDs) 26. Each of the CCDs 26 represents one picture element, or pixel, of the picture and the full array is called the "mosaic" pattern.

Although cyan, magenta, yellow, and green filters can be used, each of the CCDs 26 herein has a green (G), red (R), or blue (B) filter over it, generally designated as the mosaic filter 28. The image recorded initially by these CCDs 26 is then electronically or magnetically recorded digitally for later playback. A processing unit 30 incorporating the present invention performs the processing of the signals from the CCDs 26 to the output of the image.

Referring now to FIG. 2, therein is shown a portion of a mosaiced image 50 in a pattern having columns 52, labeled "i" with only columns 1 through 6 shown, and rows 54, labeled "j" with only rows 1 through 6 shown. One example of a mosaiced image 50 is a pattern disclosed in U.S. Pat. No. 3,971,065 granted to Bryce Bayer titled "Color Imaging Array", which is known as a Bayer pattern. Row 1 starts with G and alternates with R. Row 2 starts with B and alternates with G. The subsequent rows alternate with GRG and then BGB.

Figure 3:
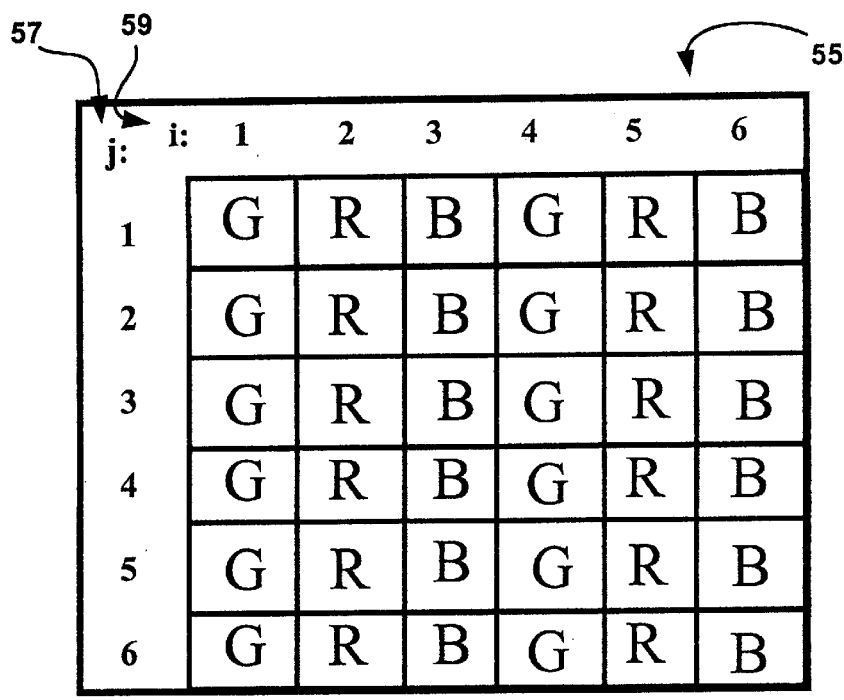
FIG. 3 is a mosaiced image in a strip pattern.

Referring, now to FIG. 3, therein is shown a portion of another mosaiced image 55 in a pattern having columns 57, labeled "i" with only columns 1 through 6 shown, and rows 59, labeled "j" with only rows 1 through 6 shown. One example of a mosaiced image 55 is known as a "strip" pattern. Column 1 is all G; column 2 is all R; and column 3 is all B. The columns then repeatedly repeat G, R, and then B.

Figure 4:
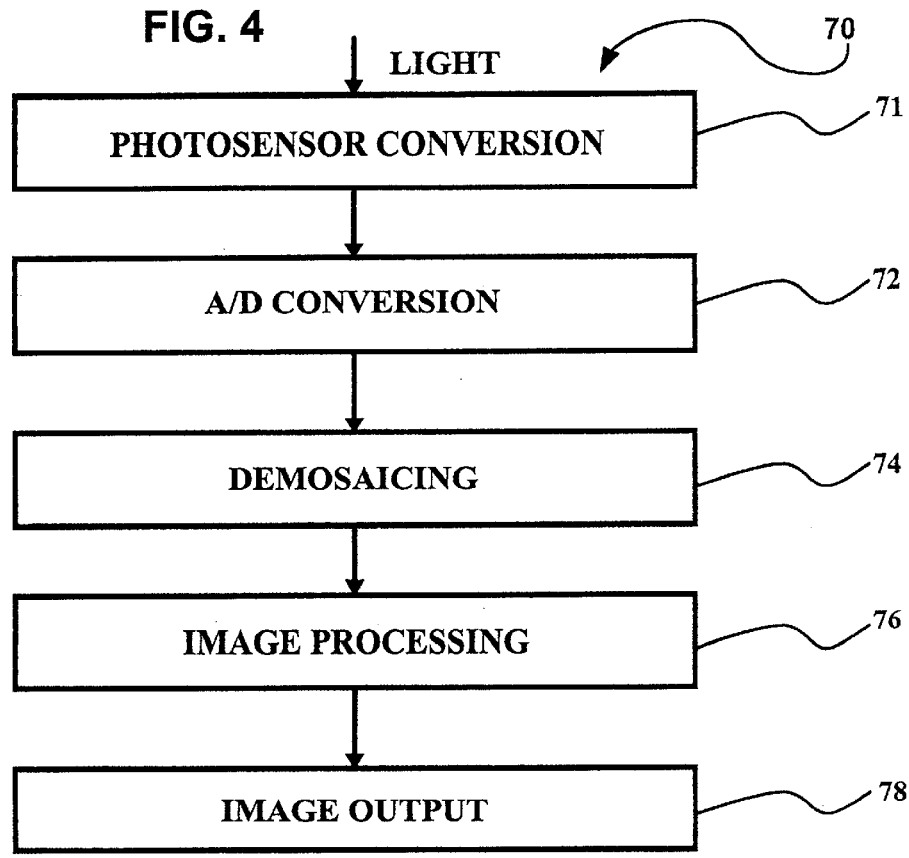
FIG. 4 is a flow chart of the process used in the solid state digital camera of FIG. 1.

Referring now to FIG. 4, therein is shown a flow chart 70 of the solid state digital camera 10 with light from an image passing through the mosaic filter 28 on to the CCDs 26. The CCDs 26 photo-electrically convert the light falling on them into proportional analog electrical signals in photosensor conversion 71. The analog signals are converted to digital signals by an analog to digital (A/D) conversion 72. The digital signals are then output for demosaicing 74. After demosaicing 74, the output is subject to image processing 76. In the image processing 76, the output of the demosaicing 74 will go through the series of conventional image processing steps, including white balancing and compression, and finally be output to the image output 78 for user devices such as a recording unit or display device. Generally, as would be evident to those skilled in the art, the mechanisms or units for performing the steps of the method would be a matter of design based on the descriptions provided herein.

Figure 5:
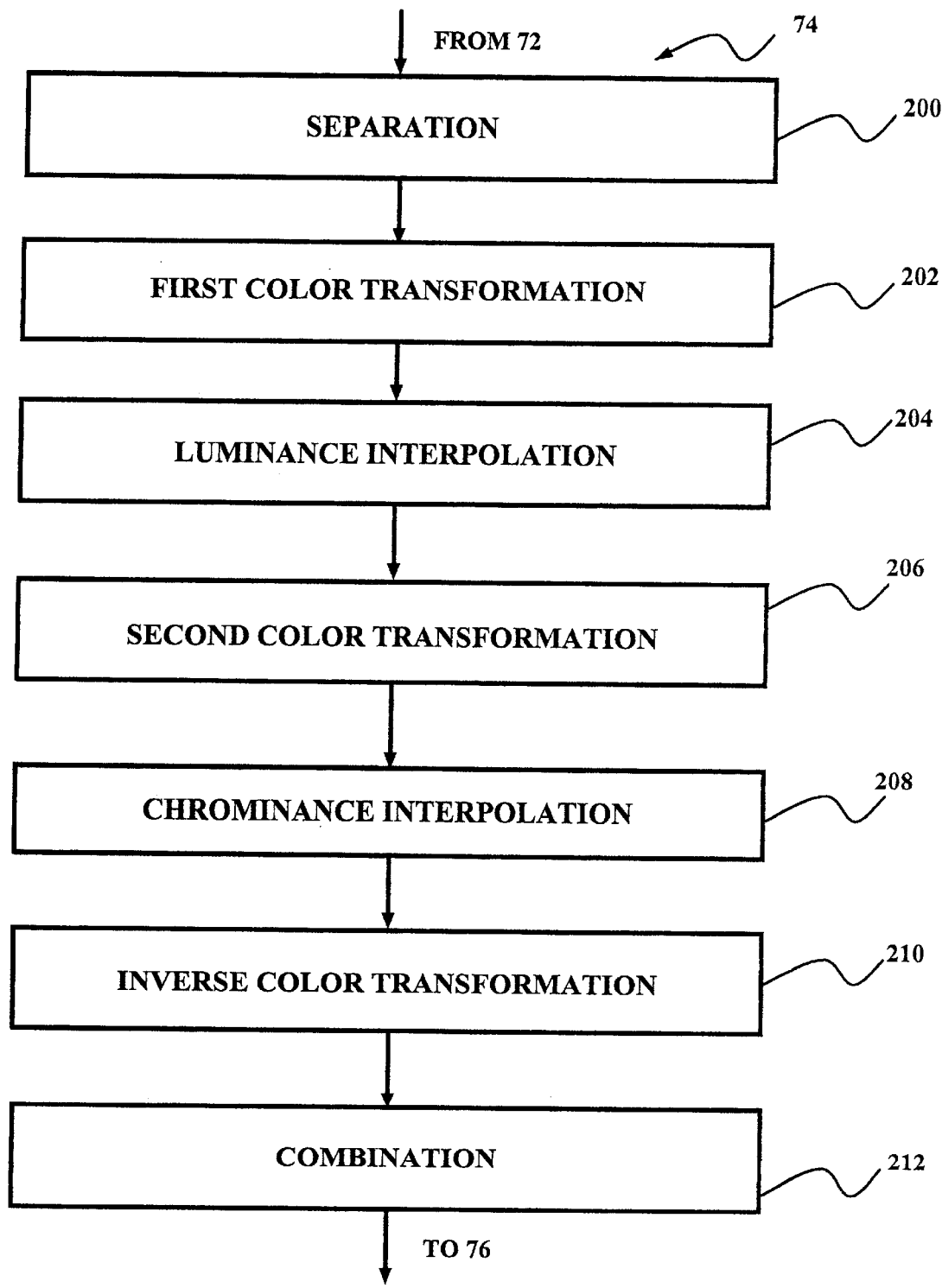
FIG. 5 is a flow chart of the process used in the demosaicing of the present invention.

Referring now to FIG. 5, therein is shown the demosaicing 74 program using color transformations into perceptually uniform color spaces. The term "luminance (L)" is used herein in a broad sense to refer to the color vector which is the major contributor of luminance information. The term "chrominance" refers to those color vectors a* and b* other than the luminance color vectors which provide a basis for defining an image. The digital signals from the A/D conversion 72 are separated into image planes in a separation 200 process.

Figures 6, 7:
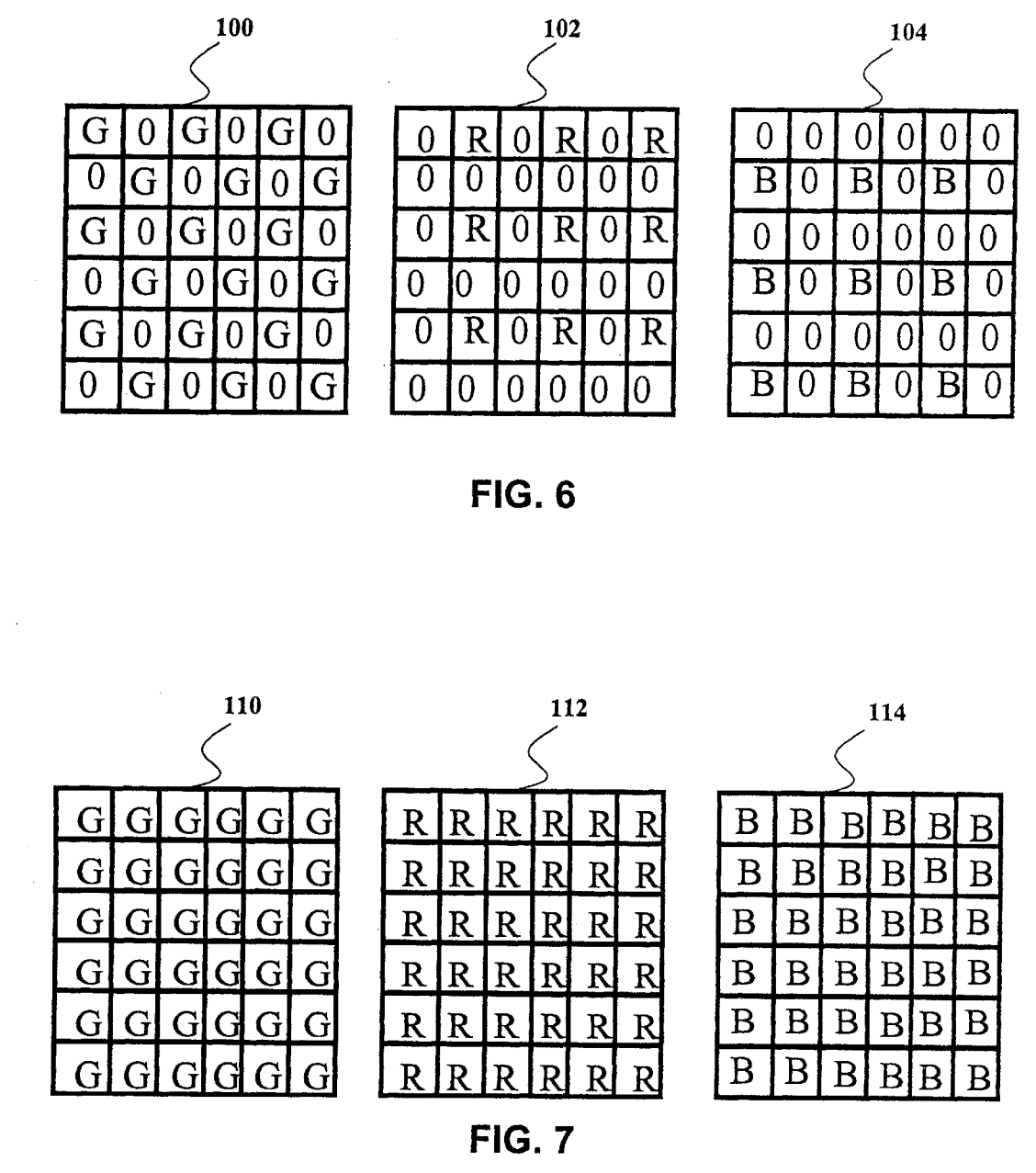

Referring now to FIG. 6, therein is shown a series of three mosaiced image planes 100, 102, and 104 which are outputs of the separation 200.

Referring back to FIG. 5, the outputs of the separation 200 undergo a first color transformation 202, which transforms the known color components into a perceptually uniform color space where L can be determined. L is then used to interpolate missing L components by luminance interpolation 204. The output of the luminance interpolation 204 then undergoes a second color transformation 206 which transforms the known color components into chrominance space. The output of the second color transformation 206 is inputted into chrominance interpolation 208. After interpolation of the missing chrominance components, an inverse color transformation 210 is applied which is combined in combination 212 process. The combination 212 outputs to the image output 78.

Referring now to FIG. 7, therein is shown a series of three demosaiced image planes 110, 112, and 114 which are the inputs to the combination 212.

Figure 8:
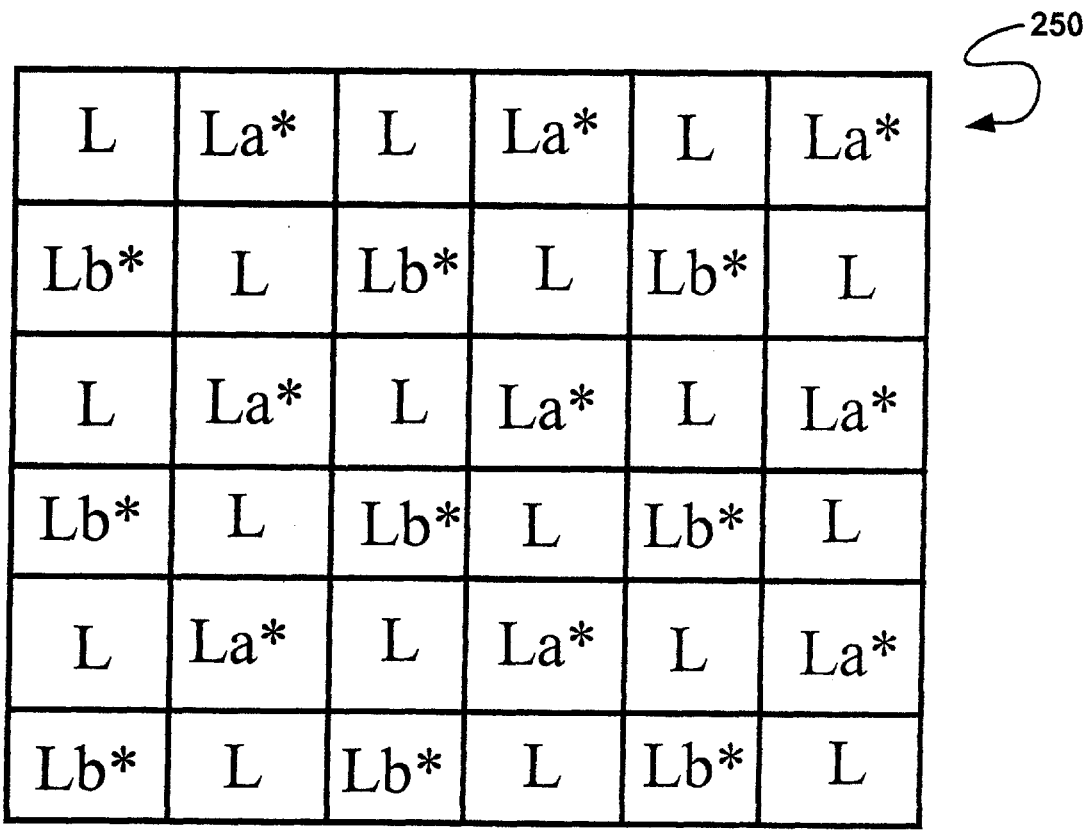
FIG. 8 is the output of the second color transformation of the present invention.

Referring now to FIG. 8, therein is shown the output of the second color transformation is 206 which is an array 250 starting with a column with alternating L and Lb* alternating with columns with alternating La* and L.

Figure 9:
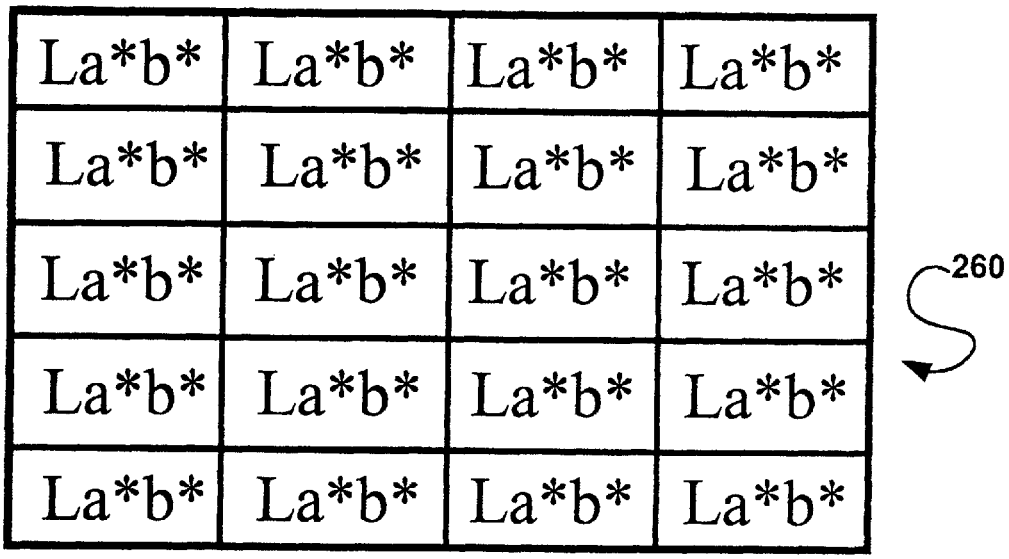
FIG. 9 is the output of the chrominance interpolation of the present invention.

Referring now to FIG. 9, therein is shown the output of the chrominance interpolation 208 which is an array 260 filled with La*b*.

Figure 10:
FIG. 10 is a full RGB image output after the demosaicing of the present invention.

Referring now to FIG. 10, therein is shown a full demosaiced RGB image 270 that is an array filled with RGB.

In use, light from the image would enter the camera 10 through the lens filter 15 and lens system 14 to be reflected by the mirror 16 which would be in the down position. The light would be reflected upwards into the prism 20 and be reflected through the prism 20 to exit out the eyepiece 22 where the user could see the exact image seen through the lens filter 15 and the lens system 14.

When a picture is being taken, the mirror 16 pivots up and out of the way so light passes through the mosaic filter 28 and strikes the single-channel solid-state CCDs 26. After a single-channel image is created from the mosaiced sensor array, each pixel has one color component, R, G, or B and a mosaiced image 50 in the Bayer pattern of FIG. 2 or a mosaiced image 55 in the strip pattern of FIG. 3 is formed. The mosaiced image 50 or 55 will be digitized by the A/D conversion 72.

Demosaicing is subsequently applied to generate the missing color components. For example, for the pixel at the upper-left corner (bold-faced and italicized) in FIG. 2 (PRIOR ART), only the G component is created from the CCDs 26. The missing R and B components have to be generated by demosaicing 74. As yet another example, for the pixel in the middle R (bold-faced and italicized), the missing G and B components will be generated through demosaicing. The output is subsequently subject to demosaicing 74 where the mosaiced image 50 is. demosaiced and the full RGB image 270 is generated. The full RGB image 270 after demosaicing is shown in FIG. 8.

The demosaicing 74 plays an important role in the digital camera 10. It has direct impact on the image quality. The filter used in demosaicing needs to have good frequency response, be interpolating, and be smooth. To meet these requirements interpolators, or filters, such as "wavelet filters" are used in the present invention. Wavelet filters have been used for the analysis and the synthesis of signals, especially when such signals correspond to sounds or images. Previously, they have been used for images predominantly in image compression. A "wavelet transform" allows the representation of any arbitrary signal as a superposition of wavelets. The wavelets are functions generated from a single function by dilations and translations and they allow decomposition of a signal into different levels (each of which is further decomposed with a resolution adapted to the particular level). A description of the wavelet filters is provided in concurrently filed U.S. Patent Application Ser. No. 09/412,351 entitled DEMOSAICING USING WAVELET FILTERING FOR DIGITAL IMAGING DEVICE, by Bo Tao, supra, which is incorporated by reference. The demosaicing 74 of the present invention is shown in detail in FIG. 5.

The mosaiced output from A/D conversion 72, as shown in FIG. 2, is provided for demosaicing 74, as shown in FIG. 4. The mosaiced output is first separated by the data separation 200 into the three separated mosaiced image planes 100, 102, and 104, as shown in FIG. 6. The mosaiced image planes 100, 102 and 104 are the inputs for first color transformation 202 such that:

L=f(G),

R'=f(R), and

B'=f(B), where: f(·)=log(·) or f(·)=(·)^α where α can be chosen to be ⅓ or a reasonable number that approximates the retinal response of the human vision system.

In the alternative, f can be in other forms that approximates the retinal response of the human vision system.

The L component of the output of the first color transformation 202 is in a perceptually uniform color space by virtue of the above approximation and provides the luminance which can be subsequently used.

A number of methods can be used for estimating the missing L component values, including linear, bilinear, and bicubic, among others. The output image of the luminance interpolation has a known L component at each pixel position.

The luminance interpolation 204 uses a quincunx wavelet filter in the preferred embodiment. The filter is two-dimensional. The coefficients of one such filter are given in Table I below:

The luminance interpolation 204 performs the following summation:

$$Y_L(i, j) = \sum_{m=-4}^{4}\sum_{n=-4}^{4} F_1(m, n) \times X_L(i+m, j+n)/2^{15} \times \sqrt{2}/k$$

with k given by:

$$k = \sum_{m=-4}^{4}\sum_{n=-4}^{4} F_1(m, n).$$

Other thresholds can be used also. The output of the luminance interpolation 204 is provided for the second color transformation 206.

With L known at all pixel positions now, R' and B' are subject to a second color transformation 206 where the R and B components are known to determine the chrominance components:

a*=L-R'; and b*=L-B'

TABLE I

| 0 | 0 | 0 | 0 | 0 | 0 | -1 | 0 | 0 | 0 | 0 | 0 |
|---|---|---|---|---|---|----|---|---|---|---|---|
| 0 | 0 | 0 | 0 | 0 | -6 | 0 | -6 | 0 | 0 | 0 | 0 |
| 0 | 0 | 0 | 0 | -15 | 0 | 60 | 0 | -15 | 0 | 0 | 0 |
| 0 | 0 | 0 | -20 | 0 | 294 | -128 | 294 | 0 | -20 | 0 | 0 |
| 0 | 0 | -15 | 0 | 456 | -384 | -993 | -384 | 456 | 0 | -15 | 0 |
| 0 | -6 | 0 | 294 | -384 | -2604 | 4992 | -2604 | -384 | 294 | 0 | -6 |
| -1 | 0 | 60 | -128 | -993 | 4992 | 26608 | 4992 | -993 | -128 | 60 | 0 |
| 0 | -6 | 0 | 294 | -384 | -2604 | 4992 | -2604 | -384 | 294 | 0 | -6 |
| 0 | 0 | -15 | 0 | 456 | -384 | -993 | -384 | 456 | 0 | -15 | 0 |
| 0 | 0 | 0 | -20 | 0 | 294 | -128 | 294 | 0 | -20 | 0 | 0 |
| 0 | 0 | 0 | 0 | -15 | 0 | 60 | 0 | -15 | 0 | 0 | 0 |
| 0 | 0 | 0 | 0 | 0 | -6 | 0 | -6 | 0 | 0 | 0 | 0 |
| 0 | 0 | 0 | 0 | 0 | 0 | -1 | 0 | 0 | 0 | 0 | 0 |

However, other wavelet filters can be used as well. Where $F_1$ represents this filter and $X_L$ represents the L output, at pixel position (i,j), the interpolated data is given by the following equation:

$$Y_L(i, j) = \sum_{m=-6}^{6}\sum_{n=-6}^{6} F_1(m, n) \times X_L(i+m, j+n)/2^{15} \times \sqrt{2}$$

where $Y_L$ is the interpolated L output as shown in FIG. 8.

An alternative embodiment of this invention can be realized by thresholding the filter $F_1$, i.e. setting those coefficients of $F_1$ smaller than a threshold to zero. This can reduce the computational cost. One thresholded filter, $F_1$, is shown in Table II below with the threshold set at 15:

TABLE II

| 0 | 0 | -15 | 0 | 60 | 0 | -15 | 0 | 0 |
|---|---|-----|---|----|---|-----|---|---|
| 0 | -20 | 0 | 294 | -128 | 294 | 0 | -20 | 0 |
| -15 | 0 | 456 | -384 | -993 | -384 | 456 | 0 | -15 |
| 0 | 294 | -384 | -2604 | 4992 | -2604 | -384 | 294 | 0 |
| 60 | -128 | -993 | 4992 | 26608 | 4992 | -993 | -128 | 60 |
| 0 | 294 | -384 | -2604 | 4992 | -2604 | -384 | 294 | 0 |
| -15 | 0 | 456 | -384 | -993 | -384 | 456 | 0 | -15 |
| 0 | -20 | 0 | 294 | -128 | 294 | 0 | -20 | 0 |
| 0 | 0 | -15 | 0 | 60 | 0 | -15 | 0 | 0 |

After the second color transformation 206, the image output is in the form of the array 250 shown in FIG. 8.

The missing chrominance signals a* and b* are then subject to chrominance interpolation 208. A number of algorithms can be used in the chrominance interpolation 208, such as linear, bilinear, bicubic, and so forth. One such interpolation filter is given by:

$F_2$=[-0.045636 -0.028772 0.29563.6 0.557543 0.295636 -0.028772 -0.045636]

However, other filters can be employed too. Two filtering processes need to be performed, once in the horizontal direction and the other one in the vertical direction. The order in which to perform the two processes is arbitrary. In the following, the program does the vertical filtering first. When the filtering is applied in the vertical direction, at pixel position (i,j), the output is given by:

$$Z_{a^*}(i, j) = \sum_{m=-3}^{3} F_2(m) \times X_{a^*}(i+m, j) \times 2 \times \sqrt{2}$$

where: $X_{a^*}$ represents the a* output of the second color transformation 206.

After $Z_{a^*}$ has been computed, each row is flipped. Then:

$Z'_{a^*}(i,j)=Z_r(i,N-1-j)$ where: $Z'_{a^*}$ represent this new signal with pixel index i=0, ... , N-1, j=0, ... , N-1.

Horizontal filtering is performed on $Z'_{a^*}$ and the a* output of the chrominance interpolation 208 is given by:

$$Y'_{a^*}(i, j) = \sum_{n=-3}^{3} F_2(n) \times Z'_{a^*}(i, j+n) \times \sqrt{2}.$$

Each row of $Y'_{a^*}$ is flipped to get the output $Y_{a^*}$. Then: $Y_{a^*}(i,j)=Y'_{a^*}(i,N-1-j)$.

The b* interpolation uses the same filter $F_2$ as the a* interpolation. The only difference between these two interpolations is that in the b* interpolation, the two flipping processes are performed during vertical filtering, while no flipping is needed for horizontal filtering.

The output of the chrominance interpolation is in the form of the array 260 of FIG. 9 with La*b* values known at all pixel positions.

An inverse color transformation 210 brings the image 260 of FIG. 9 back into RGB space by doing the following computation:

$G=f^{-1}(L)$ $R=f^{-1}(L-a^*)$ $B=f^{-1}(L-b^*)$

After combination 212, the full RGB image 260 output is then provided to the image processing 76. In the image processing 76, the RGB image will go through the series of conventional image processing steps, including white balancing and compression, and finally be output as the image output 78.

As described above, the present invention provides super-resolution imaging for any application involving data interpolation and more particularly for generating high-resolution image/video from a low-resolution image/video. One application is in the interpolation of an NTSC or CCIR-601 signal into a HDTV signal.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

What is claimed is:

1. A demosaicing method comprising the steps of:

receiving patterned mosaiced images in a plurality of colors; and demosaicing icing including the steps of:
 separating the patterned mosaiced images into a plurality of single color planes;
 a first color transformation on the plurality of single color planes to determine luminance;
 a luminance interpolation on the output of said first color transformation;
 a second color transformation on the output or said luminance interpolation to determine chrominance;
 a chrominance interpolation on the output of said second color transformation;
 an inverse color transformation on the output of said chrominance interpolation to provide single color images; and
 combining the output of said inverse color transformation into a demosaiced color images, wherein the luminance interpolation makes an L interpolation that:

$$Y_L(i, j) = \sum_{m=-6}^{6} \sum_{n=-6}^{6} F_1(m, n) \times X_L(i+m, j+n)/215 \times \sqrt{2}$$

where: $Y_L$ is a mosaiced output of the L interpolation, $F_1$ represents a filter, and $X_L$ represents a luminance output.

2. The demosaicing method as claimed in claim 1 wherein said step of: chrominance interpolation includes a step using a wavelet filter for filtration of at least one of the plurality of single color images.

3. The demosaicing method as claimed in claim 1 wherein said step of: chrominance interpolation includes a step using a single-dimensional quincunx wavelet filter for filtration of at least one of the plurality of single color images.

4. The demosaicing method as claimed in claim 1 wherein said step of: luminance interpolation includes a step using a single-dimensional quincunx wavelet filter.

5. A demosaicing method in a digital camera comprising the steps of:

focusing light from an image through a lens;

filtering the light into mosaiced red (R), green (G), and blue (B) lights;

converting the mosaiced R, G, and B lights into patterned mosaiced images; and demosaicing including the steps of:
 separating the patterned mosaiced images into single R, G, and B color planes;
 a first color transformation on the plurality of single of R, G, and B color planes to determine luminance L;
 a luminance interpolation on the output of said first color transformation;
 a second color transformation on the output of said luminance interpolation to determine chrominance, a* and b*;
 a chrominance interpolation on the output of said second color transformation;
 an inverse color transformation on the output of said chrominance interpolation to provide single color images; and
 combining the output of said inverse color transformation into a demosaiced RBG image output, wherein the first color transformation makes a determination that:

L=f(G), R'=f(R), and B'=f(B), where: L is the luminance and f( )=log( ); and luminance interpolation makes an L interpolation that:

$$Y_L(i, j) = \sum_{m=-6}^{6} \sum_{n=-6}^{6} F_1(m, n) \times X_L(i+m, j+n)/215 \times \sqrt{2}$$

where: $Y_L$ is a mosaiced output of the L interpolation, $F_1$ represents a filter, and $X_L$ represents a luminance output.

6. The demosaicing method in a digital camera as claimed in claim 5 wherein said steps of:

second color transformation makes the transformation that:
 a*=L-R' and b*=L-B'
 where: a* and b* are chrominance components;

chrominance interpolation makes the interpolation of missing a* and b*; and inverse color transformation makes the inverse color transformation that:
 $G=f^{-1}(L)$; $R=f^{-1}(L-a^*)$; $B=f^{-1}(L-b^*)$.

7. The demosaicing method in a digital camera as claimed in claim 6 wherein said step of: chrominance interpolation includes a step of filtration using a one-dimensional wavelet filter.

8. The demosaicing method in a digital camera as claimed in claim 7 wherein said step of: filtration using said one-dimensional wavelet filter is performable in a horizontal direction and in a vertical direction.

9. The demosaicing method in a digital camera as claimed in claim 8 including a step of: flipping the output of the filtration twice after the vertical direction filtration.

10. The demosaicing method in a digital camera as claimed in claim 5 wherein said step of: luminance interpolation includes a step of filtration using a quincunx wavelet filter.

11. The demosaicing method in a digital camera as claimed in claim 10 wherein said step of filtration uses a threshold quincunx wavelet filter whereby the filter coefficients of said quincunx wavelet filter below a predetermined value are set to zero.

12. A digital camera comprising:
a lens for focusing light from an image;
a mosaiced filter for converting the light into mosaiced colors;
a photosensor array associated with said mosaiced filter and having a plurality of elements for receiving each of the plurality of mosaiced colors and providing a plurality of outputs as a patterned mosaic image;
a demosaicing unit connected to said photosensor array and including:
a first color transformation unit operatively connected to said photosensor array;
a luminance interpolation unit operatively connected to said first color transformation unit;
a second color transformation unit operatively connected to said luminance interpolation unit;
a chrominance interpolation unit operatively connected to said second color transformation unit;
an inverse color transformation unit operatively connected to said chrominance interpolation unit; and
an image output device operatively connected to said demosaicing unit to output a demosaiced image,
wherein luminance interpolation makes an the L interpolation that:

$$Y_L(i, j) = \sum_{m=-6}^{6} \sum_{n=-6}^{6} F_1(m, n) \times X_L(i+m, j+n)/215 \times \sqrt{2}$$

where: $Y_L$ is a mosaiced output of the L interpolation, $F_1$ represents a filter, and $X_L$ represents a luminance output.

13. The digital camera system as claimed in claim 12 wherein: said demosaicing unit includes a separation unit for separating the plurality of colors into separate color images; and said demosaicing unit includes a combination unit for combining said separate color images.

14. The digital camera system as claimed in claim 13 wherein: one of said interpolation units includes a one-dimensional wavelet filter.

15. The digital camera system as claimed in claim 14 wherein: said one-dimensional wavelet filter is capable of performing a filtration in a horizontal direction and a filtration in a vertical direction.

16. The digital camera system as claimed in claim 15 wherein: said chrominance interpolation unit is capable of manipulating the output of a filtration a plurality of times a filtration.

17. The digital camera system as claimed in claim 12 wherein: one to said interpolation units includes a quincunx wavelet filter.

18. The digital camera system as claimed in claim 17 wherein: said quincunx wavelet filter is thresholded whereby the filter coefficients of said quincunx wavelet filter below a predetermined value are set to zero.

19. A digital camera comprising:
a lens for focusing light from an image;
a mosaiced filter for converting the light into mosaiced R, G, and B lights;
a photosensor array associated with said mosaiced filter and having a plurality of elements for receiving each of the plurality of mosaiced R, G, and B lights and providing a plurality of outputs as a patterned mosaic image;
a demosaicing unit connected to said photosensor array and including:
a first color transformation unit operatively connected to said photosensor array;
a luminance interpolation unit operatively connected to said first color transformation unit;
a second color transformation unit operatively connected to said luminance interpolation unit;
a chrominance interpolation unit operatively connected to said second color transformation unit;
an inverse color transformation unit operatively connected to said chrominance interpolation unit; and
an image output device operatively connected to said demosaicing unit in said demosaicing unit to output a RGB demosaiced image,
wherein luminance interpolation makes an L interpolation that:

$$Y_L(i, j) = \sum_{m=-6}^{6} \sum_{n=-6}^{6} F_1(m, n) \times X_L(i+m, j+n)/215 \times \sqrt{2}$$

where: $Y_L$ is a mosaiced output of the L interpolation, $F_1$ represents a filter, and $X_L$ represents a luminance output.

20. The digital camera as claimed in claim 19 wherein:
said first color transformation unit makes a determination that:
L=f(G), R'=f(R), and B'=f(B),
where: L is the luminance and f( )=log( )
said second color transformation unit makes the transformation that:
a*=L−R' and b*=L−B'
where: a* and b* are chrominance components;
said chrominance interpolation unit makes the interpolation of missing a* and b*; and
said inverse color transformation unit makes the inverse color transformation that:
G=f$^{-1}$(L); R=f$^{-1}$(L−a*); B=f$^{-1}$(L−b*).

21. The digital camera as claimed in claim 20 wherein:
said demosaicing unit includes a separation unit for separating the mosaiced R, G, and B lights into separate RGB color images; and
said demosaicing unit includes a combination unit for combining said separate RGB color images.

22. The digital camera as claimed in claim 21 wherein:
one of said interpolation units includes a one-dimensional wavelet filter; and one of said interpolation units includes a quincunx wavelet filter.

23. The digital camera as claimed in claim 22 wherein: said one-dimensional wavelet filter is capable of performing a filtration in a horizontal direction and a filtration in a vertical direction.

24. The digital camera as claimed in claim 23 wherein: said quincunx wavelet filter is thresholded whereby the filter coefficients of said quincunx wavelet filter below a predetermined value are set to zero.

* * * * *